Oct. 4, 1955 W. A. CALDWELL 2,719,560
AUTOMATIC TIRE PUMP CONTROL
Filed March 9, 1953 2 Sheets-Sheet 1

William A. Caldwell
INVENTOR.

BY

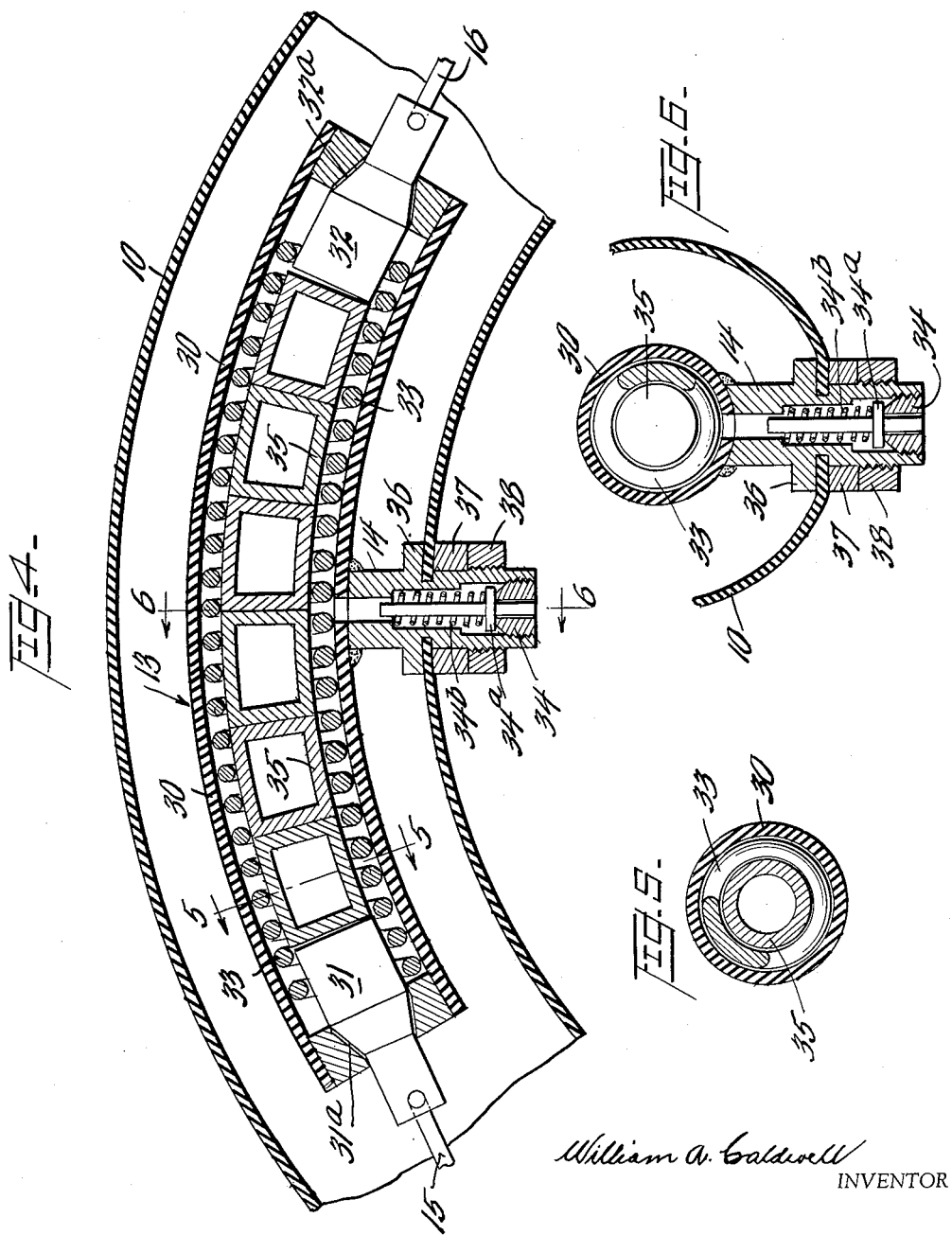

United States Patent Office 2,719,560
Patented Oct. 4, 1955

2,719,560

AUTOMATIC TIRE PUMP CONTROL

William A. Caldwell, Leesburg, Tex.

Application March 9, 1953, Serial No. 341,077

2 Claims. (Cl. 152—419)

My present invention relates to automatic tire pumps of a certain type operated by centrifugal force created by the rotation of the tire to maintain the normal operational pressure of the tire when associated with a motor vehicle. It has for its object to provide certain improvements in the construction of such pumps, particularly the means for transmitting the centrifugal force by which they are operated, primarily for the purpose of controlling the operation of the pumps so that the minimum speed which must be attained or reverted to by the associated motor vehicle before the pump will begin or cease to operate may be predetermined, and so that the operation of the pump may be otherwise coordinated with the usual fluctuating speed of such vehicle.

A second purpose served by my invention is to provide protection against possible interference by the mechanism for transmitting the centrifugal force with the power member of relief valves and pressure signals of a certain type when used conjointly with the automatic air pump.

To these and other ends, my invention comprises other improvements and advantages as will be fully described in the accompanying specification, the novel features thereof being set forth in the appended claims.

In the drawings:

Figure 4 is an enlarged lengthwise sectional view of the body of the automatic tire pump.

Figure 5 is a cross sectional view of the body of the tire pump taken along the line 5—5, Figure 4.

Figure 6 is a cross sectional view of the body of the pump taken along the line 6—6, Figure 4.

Similar reference numerals in the several figures indicate similar parts.

Figure 1:
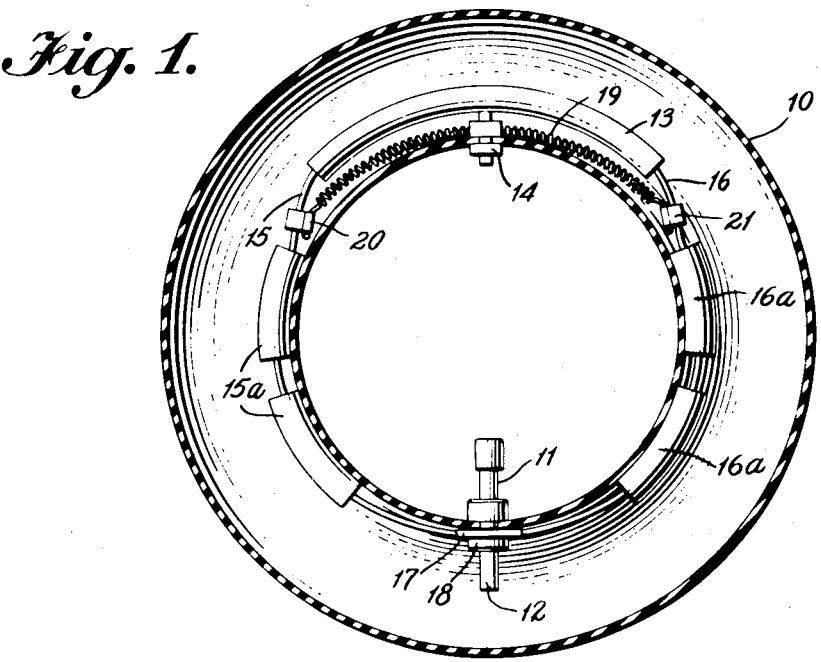
Figure 1 is a vertical section of the inner tube of an inflated pneumatic tire equipped with an automatic inflation pump, pressure signal and relief valve, illustrating the several elements of my invention as they appear in elevation.
Figure 2:
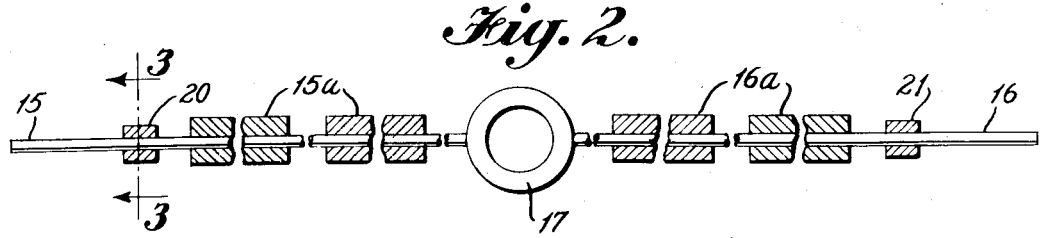
Figure 2 is a lengthwise section of an extended transmission rod.
Figure 3:
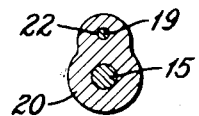
Figure 3 is a cross section of the transmission rod taken along the line 3—3, Figure 2.

Referring more particularly to the drawings, Figure 1 shows an inflated inner tube 10; its air inlet valve 11; the valve's associated power member 12; an automatic tire pump 13; its air inlet valve 14; a flexible transmission rod having two sections 15, 16; weights 15a, 16a; a circular link 17 uniting the two sections of the transmission rod and encircling flange 18 of the inlet valve 11; a contractile coil spring 19; and lugs 20, 21. The lugs 20, 21, Figure 3, are provided with eyelets 22, in which the ends of the spring 19 are fastened, the lugs being secured to the transmission rod 15—16.

The automatic tire pump 13 comprises among other parts, a flexible tubular body 30, Figure 4, having valves 31—31a, 32—32a in its ends, numerals 31, 32 designating the heads and 31a, 32a the seats of the valves; a contractile coil spring 33 having its ends fastened to the valve heads 31, 32 spacing them and normally holding the valves open; an inlet valve 14 comprising the seat 34, the head 34a and the compression coil spring 34b, which serves to put the interior of the tubular body 30 in connection with the exterior of the tire; and fillers 35 disposed within the coils of the spring 33, which serve to reduce the air space in the body of the pump in its inactive position, thereby increasing its suction power when extended. The base of the inlet valve is provided with a flange by which it is cemented or otherwise fastened to the outer surface of the tubular body 30 over an aperture in its wall, and a flange 36 engaging the inner surface of the tube 10, to which it is clamped by a collar 37 and a nut 38. The valve heads 31, 32 are fastened by suitable means to opposite ends of the transmission rod 15—16.

Describing the operation of the pump, when the associated motor vehicle is put in motion, the valves 31—31a, 32—32a in the ends of the tubular body 30 of the pump are closed and the body itself elongated by the centrifugal force created by the rotation of the tire, whereby a partial vacuum is created in it which serves to draw air through the inlet valve 14 into the body of the pump. And when the centrifugal force ceases, the pump will return to its normal inactive position, thereby allowing the air which was drawn into its extended body to commingle with that surrounding it in the inner tube 10.

As now constructed, the operation of the pump begins and ends simultaneously with the beginning and ending of the centrifugal force created by the rotation of the tire, which coincide with the starting and stopping of the associated motor vehicle. The outstanding fetaure of my invention is that the lugs 20, 21 are so located on the transmission rod 15—16 between the weights and the ends of the pump as to cause the spring 19 to neutralize the said centrifugal force to the extent of preventing it from effecting changes in the normal inactive position of the pump when the motor vehicle carrying the tire in which the pump is installed is traveling at a speed less than a minimum speed indirectly predetermined by the spring 19 and the weights 15a, 16a.

Once the body of the pump has been elongated, it will remain in that condition until the speed of the associated motor vehicle has fallen below the predetermined minimum required to activate the pump, when the entire pump will return to its normal inactive position, thereby allowing the air drawn into the pump when it was elongated to commingle with that surrounding it in the inner tube 10, this whether or not the motor vehicle comes to a complete stop.

The main function of the spring 19 is to overcome certain mechanical difficulties which make it infeasible to obtain the results desired by manipulating the constant of spring 33. For if the spring 33 be made strong enough to hold the valve heads 31, 32 immobile until the associated motor vehicle attains a desirable minimum speed, it would be too strong to permit of the proper elongation of the pump short of a prohibitive speed of the motor vehicle. This difficulty might be overcome by lengthening the body 13 of the pump so as to allow the valve heads 31, 32 more play but for the fact that this would involve, in the ordinary course of operation, a prohibitive increase of the volume of air under pressure in the body of the pump, which must be rarified to produce the vacuum necessary to suck air into the body of the pump from the outside.

The intake of air through the pump into the tire will be repeated as often as the speed of the associated motor vehicle fluctuates, first greatly above and then below to a lesser extent the predetermined minimum speed previously described.

The head of the power member 12 normally engages the flange 18 of the inlet valve 11. As now constructed, the transmission rod is divided into two sections 15, 16, each of which has one end fastened to opposite ends of the pump 13 and the other end to the flange 18 of the inlet valve 11; or the sections might be united, in which case the integrated rod would by-pass the flange 18. In either case there is considerable danger that the operation of the power member 12 might be interfered with. The link 17 is made of suitable size and shape to encircle the head of the power member, thus eliminating this danger.

In the construction of my invention as above described, a flexible rod is used to transmit the operational centrifugal force to the pump mechanism, but a chain, band or cable would serve equally as well.

This application is a modification of the one filed February 27, 1952, Serial No. 273,722, now abandoned.

I claim:

1. The combination with a pneumatic tire for motor vehicles, an automatic air pump disposed in the tire comprising a flexible tubular body provided with a tubular stem having an inlet valve connecting the interior of the tubular body with the exterior of the tire, a valve normally held open in each end of the tubular body by a contractile spring, a flexible rod having two equal sections joined by a circular open link extending around the inner circumference of the tire with its ends fastened suitably to the valves in the ends of the tubular body, weights carried by the rod which serve under action of centrifugal force created upon rotation of the tire to operate the pump and a second contractile spring having its ends connected to the flexible rod and adapted to exclude the pump from action of the centrifugal force until the rotating tire has attained a predetermined speed and to relieve the pump from action when the tire rotates below said predetermined speed.

2. The combination with a pneumatic tire for motor vehicles, an automatic air pump disposed in the tire comprising a flexible tubular body having in each end valves normally held open by a contractile spring, a flexible rod extending around the inner circumference of the tire with its ends fastened suitably to the valves in the ends of the tubular body, weights carried by the rod which serve under action of centrifugal force created upon rotation of the tire to operate the pump, a second contractile spring having its ends connected to the flexible rod between the valves in the end of the tubular body and the weights to prevent the centrifugal force from acting on the pump when the tire is rotating at a speed less than a predetermined minimum speed required to operate the pump.

References Cited in the file of this patent
UNITED STATES PATENTS 2,512,766    Caldwell _____ June 27, 1950